United States Patent [19]

Blackard et al.

[11] Patent Number: 5,301,302
[45] Date of Patent: Apr. 5, 1994

[54] MEMORY MAPPING AND SPECIAL WRITE DETECTION IN A SYSTEM AND METHOD FOR SIMULATING A CPU PROCESSOR

[75] Inventors: Joe W. Blackard; Richard G. Fogg, Jr.; Arturo M. de Nicolas, all of Austin, Tex.

[73] Assignee: International Business Machines, Armonk, N.Y.

[21] Appl. No.: 680,636

[22] Filed: Apr. 2, 1991

Related U.S. Application Data

[63] Continuation of Ser. No. 151,135, Feb. 1, 1988, abandoned.

[51] Int. Cl.$^5$ .............................................. G06F 9/455
[52] U.S. Cl. .................................. 395/500; 395/200; 395/375; 395/600; 364/232.3; 364/259.4; 364/259; 364/260.81; 364/260.4; 364/261.1; 364/261; 364/DIG. 1
[58] Field of Search ............... 364/DIG. 1, DIG. 2; 395/500, 200, 600, 375

[56] References Cited

U.S. PATENT DOCUMENTS

| | | | |
|---|---|---|---|
| 4,302,820 | 11/1981 | Struger et al. | 364/900 |
| 4,370,709 | 1/1983 | Fosdick | 364/200 |
| 4,393,443 | 7/1983 | Lewis | 364/200 |
| 4,531,215 | 7/1985 | Ladewski et al. | 364/200 |
| 4,633,417 | 12/1986 | Wilburn et al. | 364/550 |
| 4,638,423 | 1/1987 | Ballard | 364/200 |
| 4,638,426 | 1/1987 | Chang et al. | 364/200 |
| 4,685,057 | 8/1987 | Lemone et al. | 364/200 |
| 4,727,480 | 2/1988 | Albright et al. | 364/200 |
| 4,794,522 | 12/1988 | Simpson | 364/200 |
| 4,805,095 | 2/1989 | Armstrong et al. | 364/200 |
| 4,812,975 | 3/1989 | Adachi et al. | 364/300 |
| 4,839,797 | 6/1989 | Katori et al. | 364/200 |
| 4,841,476 | 6/1989 | Mitchell et al. | 364/900 |
| 4,847,805 | 7/1989 | Ishii et al. | 364/900 |
| 4,873,628 | 10/1989 | Omori et al. | 364/200 |

FOREIGN PATENT DOCUMENTS 0217068 8/1986 France .

OTHER PUBLICATIONS

May, C., "Mimic: A Fast System/370 Simulator:, SIGPLAN 1987, Proceedings of the ACM SIGPLAN '87 Symposium on Interpreters and Interpretive Techniques", Jun. 1987, 14 pages.

J. N. Brown, "Memory Mapping Device for the IBM Personal Computer", IBM Technical Disclosure Bulletin, vol. 27, No. 10A, Mar. 1985, pp. 5860-5862.

R. J. Cooper et al, "Microprocessor System Initialization Controller", IBM Technical Disclosure Bulletin, vol. 28, No. 9, Feb. 1986, pp. 3730-3733.

Graham, C., "Amiga's Trump Card: IBM PC Emulation", AmigaWorld, vol. 1, No. 2, Nov./Dec., 1985, pp. 34-35.

"SoftPC", Insignia Solutions, Inc., ISI SoftPC Data Sheet Rev., 3.0, Jan. 1987, 8 pages.

Warner, E., "Unix-Based Workstations to Run DOS", Info World, Jul. 6, 1987, p. 8.

J. J. McNeley, V. M. Milutinovic, "Emulating a Complex Instruction Set Computer with a Reduced Instruction Set Computer", IEEE Micro, vol. 7, #1 Feb. 1987, pp. 60-71.

*Primary Examiner*—Thomas C. Lee
*Assistant Examiner*—Maria N. Von Buhr
*Attorney, Agent, or Firm*—Wayne P. Bailey; Marilyn S. Dawkins

[57] ABSTRACT

The system and method of this invention simulates the flow of control of an application program targeted for a specific instruction set of a specific processor by utilizing a simulator running on a second processing system having a second processor with a different instruction set. The simulator reduces the number of translated instructions needed to simulate the flow of control of the first processor instructions by detecting, at the time of a store to memory, whether an instruction, data, or video is being updated. If the memory location that is being updated contains an instruction, the simulator takes additional steps to guarantee the correct execution of the modified instruction. If the simulator determines at the time of a store that the memory location being modified is data, the simulator needs to take no additional steps.

12 Claims, 11 Drawing Sheets

|  33 | 34 | | |
|---|---|---|---|
| CS | IP | | SP = EVEN |
| | | 121 | 100 |
| 0200 | : 0100 | CMP | AL, 9 |
| | | 122 | |
| 0200 | : 0103 | JB | 109 |
| | | 123 | |
| 0200 | : 0105 | JE | 10B |
| | | 124 | |
| 0200 | : 0107 | DEC | AX |
| | | 125 | |
| 0200 | : 0109 | SHL | BX, 1 |
| | | 126 | |
| 0200 | : 010B | ADD | BX, AX |
| | | 127 | |
| 0200 | : 010D | MOV | [02], AX |
| | | 128 | |
| 0200 | : 0110 | RET | |
| | | | 100 |

FIG. 3B

THE FOLLOWING INSTRUCTION SEQUENCE IS THEN USED ON EACH TRANSLATION OF A 80286 INSTRUCTION WHICH CAN MODIFY PC MEMORY:

| | | | |
|---|---|---|---|
| 1 CYCLE | NIUO | R1,R2,0x80FF | R2 = PC MEM ADDRESS IN SEGMENT 9 OR F |
| | | | R1 <= ADDRESS OF STATUS BYTE |
| 2 CYCLE | LC | R1,0(R1) | R1 <= STATUS VALUE |
| 1 CYCLE | EXTS | R1,R1 | CHECK IF STATUS IS ZERO OR NON-ZERO |
| 1 CYCLE | BNE | SUBROUTINE | JMP TO SUBROUTINE IF STATUS IS NON-ZERO |

COPYRIGHT IBM CORPORATION 1988

```
XIL    t_1,t_0,PREVIOUS_IP # COMPARE BYTE REVERSED IP WITH PREVIOUS
BEQ    TARGET              # RELATIVE CONDITIONAL BRANCH IF THEY MATCH
       COPYRIGHT IBM CORPORATION 1988
```

MEMORY MAPPING AND SPECIAL WRITE DETECTION IN A SYSTEM AND METHOD FOR SIMULATING A CPU PROCESSOR

This is a continuation of application Ser. No. 07/151,135, filed Feb. 1, 1988 and hereby expressly abandoned.

CROSS-REFERENCES TO RELATED APPLICATIONS

Ser. No. 06/820,451, filed Jan. 17, 1986 for a VIRTUAL TERMINAL SUBSYSTEM, currently co-pending, and assigned to the same assignee as the present invention, now abandoned.

Ser. No. 07/151,136filed Feb. 1, 1988 for a CONDITION CODE GRAPH ANALYSIS FOR SIMULATING A CPU PROCESSOR, currently co-pending, and assigned to the same assignee as the present invention, which is hereby incorporated by reference now U.S. Pat. No. 4,951,195.

Ser. No. 07/151,123, filed Feb. 1, 1988 for a SYSTEM AND METHOD FOR SIMULATING THE I/0 OF A PROCESSING SYSTEM, currently co-pending, and assigned to the same assignee as the present invention, which is hereby incorporated by reference now U.S. Pat. No. 5,129,064.

Ser. No. 07/151,137, filed Feb. 1, 1988 for TRANSLATING A DYNAMIC TRANSFER CONTROL INSTRUCTION ADDRESS IN A SIMULATED CPU PROCESSOR, currently co-pending, and assigned to the same assignee as the present invention, which is hereby incorporated by reference now U.S. Pat. No. 5,167,023.

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to data processing systems running applications written for a specific first processor of a first processing system, and more particularly to a system and method of simulating the first processor for running the applications on a second processing system having a second dissimilar processor.

2. Description of the Related Art

Current advances in computer technology have lead to ever changing processors, otherwise referred to herein as the central processing unit (CPU), of the processing system. Examples of the evolution of various processors are Intel's 8088 processor used in the IBM PC, Intel's 80286 processor used in the IBM PC AT1, Intel's 80386 processor used in the IBM Personal System/2[2] model 80, and the IBM Research/ OPD Microprocessor (ROMP) which utilizes a Reduced Instruction Set Computer (RISC) architecture in the IBM RT PC[3]. Other processors include Motorola's 68000, 68020 among others.

The hardware of various processing systems changes rapidly to take advantage of the increased processing power of emerging processors. A disadvantage of changing hardware is that the software written for previous processors typically can not be used on the later hardware technology. In some cases where an application can be used on a different processing system other than the one it was originally written for, the performance of the application is not as good on the different processing system as it would have been on the processing system for which the application was originally written. As a result, software applications which may have had a long development cycle may become obsolete quickly. The demise of the earlier written software is all the more tragic when the function of the application as originally written is still very much pertinent and in demand on the new hardware processing systems.

As a result, there is typically only a limited amount of "new" software available that is specifically written for the "new" hardware design when the new hardware is initially released into the market place. This is due in part by the long development cycle of creating software application programs, and the confidentiality of the new hardware design by the manufacturer prior to releasing the hardware into the market place. The software manufacturer has to know certain facts about the hardware of a processing system before a software application program can be written for the processing system.

Ideally, a manufacturer of processing systems would like to have a vast amount of software available to run on the processing system as soon as the new hardware for the processing system is announced into the market place. A customer would more likely invest in a new processing system if the customer knows that an abundant supply of software is already available for use.

There have been several approaches in tapping the vast amount of software that has previously been written for "older" hardware designs. A previous hardware approach for being able to run applications originally written for another processor is to build the new processing system with a coprocessor. In this way, the processing system can run applications for both types of processors, the new processor and the old processor.

For example, the IBM RT PC contained an IBM PC AT coprocessor in order to use applications that were originally written for the IBM PC AT. However, since the coprocessor was supported at a low level in the operating system, the coprocessor could not take full advantage of the functions provided by the AIX[4] operating system. One of the functions provided by the AIX operating system is multi-tasking as described in co-pending application Ser. No. 820,451, filed Jan. 17, 1986 for a VIRTUAL TERMINAL SUBSYSTEM and assigned to the same assignee as the present invention, which is herein incorporated by reference.

The coprocessor, however, limits the user to one session at a time, since the coprocessor included a hardware adapter for emulating the PC AT. In other words, once the coprocessor was started, no other instances of the coprocessor could be running.

The coprocessor is also limited to the speed of the processor of the first processing system and cannot take advantage of faster second processing systems as they evolve.

A second approach is to simulate the second processor through software. A software simulator provides a mechanism to run previously written software for one processor on a new processing system having a different processor. A software approach to simulation allows taking advantage of faster second processing systems as they evolve. It also allows the use of multitasking capabilities of the operating system to provide multiple instances of the first processor.

Some software simulators on the market today include SoftPC, by Insignia Solutions, and the Amiga Transformer by Simile Research Inc. for Commodore's Amiga (based on Motorola's 68000). Information on this system was published in the article "Amiga's Trump Card: IBM PC Emulation", AMIGA WORLD, Vol. 1, No. 2, November/December 1985. Phoenix Technologies also provided a simulator to simulate the Intel processor for the Apollo machine which has a Motorola 68000 processor.

Any specific CPU processor has a specific instruction set. When a software application program is developed for a specific CPU processor, it is compiled into object code. The object code is targeted to run on any CPU that supports the specific instruction set. A simulator takes object code that was written to run on a specific instruction set, and converts it to run on a different processor which may have a similar or different instruction set. The more the two instruction sets of the two processors are different, the more difficult it is to simulate the other processor.

For example, the Intel 80286 processor has a very rich instruction set in that it provides a wide variety of instructions. Each instruction is tailored specifically for a particular type of situation. Additionally, each instruction may be able to do several operations. In contrast, the ROMP processor in the RT PC has a reduced instruction set (RISC) processor which provides fewer instructions and less function per instruction. As each instruction in the Intel 80286 may be able to do several tasks, more instructions would be required with the ROMP RISC processor to accomplish the same tasks.

However, the speed of a processor can be increased by simplifying the instruction set. Although more instructions are required, no additional time is consumed on complicated instructions while executing the more common and simpler tasks.

Previous methods of software simulators created a subroutine that would simulate the effect of an instruction. Every time the machine being simulated needed to run that instruction, the subroutine would be called in order to decode and execute that instruction. The problem with this approach is that the overhead of decoding the instruction occurs every time the subroutine is called and executed. Consequently, the speed of the simulated processor is affected.

Instead of calling a subroutine each time an instruction needed to be executed, another software simulation approach compiled a shorter sequence of host machine instructions to simulate an instruction. As a result, the overhead of decoding and translating the instruction occurs only once, during the first time the instruction is encountered. This translation is then saved. From then on, every time that instruction is simulated, the translation is executed. This is often referred to as a second generation simulator. A first generation simulator will take an instruction one at a time and decode it in real time and execute it. The decoding is done for each instruction as each instruction is needed. A second generation simulator will go through the instructions one at a time, translate the instructions, and then reuse that translation instead of going back and translating again.

A previous second generation simulator was the simulator that simulated the IBM ROMP CPU on the IBM System/370 called RSIM. This simulator reserves a fixed amount of storage for each instruction (16 bytes for every half word) called cells. IBM 370 instructions would then be generated for each one of these cells for each RT instruction. If the amount of code generated is less than what would fit in one cell, which is usually the case, then it branches to the next boundary of the next cell. If the amount of code generated to simulate the instruction can not fit into one cell, then a subroutine call is generated that branches to a run time environment set of routines which performs the emulation and returns back to the cell to complete execution. Another simulator simulates the processor of the IBM System/370 on the IBM RT PC which is described in the following article: May, C. "Mimic: A Fast System/370 Simulator", presented Jun. 11, 1987 at the Association of Computing Machinery Symposium on Interpreters and Interpretive Techniques, and published in SIGPLAN, 1987 proceedings of ACM.

A first generation simulator runs 50 to 100 host machine instructions per simulated instruction. A second generation simulator runs an average of 10 host machine instructions per simulated instruction.

If a simulator takes either 50 or 10 instructions to simulate one instruction on the simulated machine, the second processor running the simulator must be either 50 or 10 times as fast respectively as the simulated machine to be comparable in performance. It is therefore desirable to further reduce the number of simulator instructions per each simulated or translated instruction than what has previously been accomplished in the art.

For example, if a simulator could be designed to use only 4 instructions per simulated instruction, and the simulator processor is more than 4 times faster than the simulated machine processor, the simulator will be faster than the original machine being simulated. A user would then observe increased performance by using the simulated machine to run an application program than by using the machine for which the application program was originally written.

Therefore, the overall problem to overcome in simulating another processor is to further reduce the number of simulator (host) instructions per simulated instruction in order to increase the processing speed of the simulator.

SUMMARY OF THE INVENTION

It is therefore an object of this invention to reduce the average host machine instructions per simulated machine instructions.

The simulator of this invention runs applications originally written for a different processor by means of software emulation. The software approach of simulation allows the flexibility of utilizing the functions of the operating system of the simulator machine. In the preferred embodiment of this invention, the simulator runs as an application on the AIX operating system of the RT PC. It therefore can take advantage of the multitasking, multi-user capabilities of the AIX operating system to allow multiple applications originally written for the PC AT to run concurrently without any change to the application itself.

The method of simulation of this invention provides faster processing capability of the simulated processor than the previous methods of processor simulation by reducing the number of host machine instructions per simulated machine instruction. This was achieved by identifying key processing areas that had used more instructions than desired, and then by creating new methods to achieve the processing tasks through fewer instructions.

To increase the CPU simulation, i.e., reduce the average number of host instructions per simulated instruction, several key processing areas were identified that were currently utilizing more instructions than desired.

First, the processing task of maintaining and keeping the correct values of the condition codes was identified as disclosed in Ser. No. 07/151,136, filed Feb. 1, 1988 for a CONDITION CODE GRAPH ANALYSIS FOR SIMULATING A CPU PROCESSOR, currently co-pending, and assigned to the same assignee as the present invention, which is hereby incorporated by reference. The method of this invention utilizes a graph analysis technique previously applied to compiler technology, and applies it to CPU simulator technology to dynamically determine whether condition codes will be needed by any subsequent instruction. The simulator saves sufficient information to generate those condition codes that may be needed. Otherwise, the number of translated instructions required are reduced for that instruction, if it is determined from the graph analysis that the condition codes are not needed.

Another area that was addressed to reduce the average number of instructions generated involves translating the addresses of instructions as disclosed in Ser. No. 07/151,137, filed Feb. 1, 1988 for TRANSLATING A DYNAMIC TRANSFER CONTROL INSTRUCTION ADDRESS IN A SIMULATED CPU PROCESSOR, currently co-pending, and assigned to the same assignee as the present invention, which is hereby incorporated by reference. The reference discloses a three tier approach in determining the address of the next instruction by using a compare in the case where the currently executing instruction returns to the same address as the last time it executed, by using a translate look-aside buffer if it returns to an address that was returned to at least once before, if not immediately before, and by using binary trees as a last resort if the preceding two cases fail. The return address is used in a general way to refer to an address of any instruction which transfers control by computing the next target address from a value in a register or memory.

A third prime processing area that was identified for reducing the average number of host instructions per simulated instruction was the processing task of being able to detect what happens when an instruction stores to memory. The contents of memory can be divided into three areas. The contents of memory are either instructions, or data used in computation, or memory mapped I/O. Memory mapped I/O are contents of memory (referred to herein as a video buffer) that are being interpreted by hardware and presented, as an example, on a display screen. A video buffer is part of a hardware adapter that is updated by an application to display information on a output display device. Of these three different types of contents of memory, only computational data can be stored without any further action by the simulator.

If there is a store into a section of memory which contains instructions, an instruction is being modified and therefore the translation for the instruction may no longer be valid. A check for instruction modification is performed to insure that the translated code is always correct. If an application performs instruction modification, the translated code for the original code instruction is purged, and the new instruction translated to a new sequence of instructions of the simulator's processor. Other steps could be taken to guarantee that the correct translation of the instruction will be executed.

Likewise, the check for video updates is necessary to determine if the output to an output device needs to be further processed by the simulator. This would occur in the case where the output device of the first processing system is not attached to the second processing system running the simulator, and the output device of the first processing system therefore must be simulated. In the case of memory mapped I/O, it must be detected at the time of a store whether the special hardware that is representing the output data is being modified. Previous simulators spend a lot of cycles calling subroutines after performing a store to memory to determine if these two types of contents of memory, instructions and memory mapped I/O, are being affected.

The simulator of this invention provides a method for checking any first processor instruction which updates memory, to determine if the instruction is modifying a subsequent instruction or performing a video buffer update. The method of this invention reduces the number of cycles, i.e. instructions, required to detect this modification. The amount of storage required for an application program to run on the simulator has increased, but the speed has increased. Essentially, an increase in performance is achieved at the cost of increased storage space that is needed.

The system and method of this invention comprises a table that contains a one to one byte correspondence between memory and a status that indicates what type of use is being given for that specific memory location. A zero indicates that computational data is being stored at that memory location. In this way, in a virtual memory system, pages that were not previously referenced indicate the most common occurrence, which as far as can be determined, is computational data. Next, when an instruction is translated, it is known at that time that the memory locations correspond to an instruction. An indication of this information is stored in the table.

At simulator start up time, a user configures the simulator by indicating if an output device, such as a display, of the first processing system is attached to the user's processing system which is running the simulator. If there is, no additional simulator processing needs to be done to the data that is directed to an output device. If an output device of the first processing system is not attached to the second processing system, additional simulator processing is performed on the data directed to the output device to simulate the same effect on a different output device. At simulator start up time and after configuration, it is indicated that the output device is not attached by storing a non-zero value in a status table indicating that the video buffer is a special memory location needing further simulator processing.

At execution time a check is made to convert the address of the memory location being modified to an address of the table. If the contents are zero, there is no special action required since either a first processing output device is attached, or the contents of the memory location being modified is data. If the contents are non-zero, there is a specific action to take since either a first processing output device is not attached and now needs further simulating, or the contents of the memory location being modified is an instruction which requires a check to insure a correct translation is executed. This method is faster than previous methods that called a subroutine every time a check was needed.

There is a sequence of instructions that can be executed to check if there is a byte in one segment that is mapped to the other segment that indicates what type of code there is, i.e. computational data, instruction, or video data. It is very fast to pick up one byte and check whether or not it is a zero. If it is not a zero, this indicates that it is an instruction or video data requiring special handling.

BRIEF DESCRIPTION OF THE DRAWING

FIG. 3B shows a second example of a flow of control of first processor instructions to be translated.

DESCRIPTION OF THE PREFERRED EMBODIMENT

Figure 1:
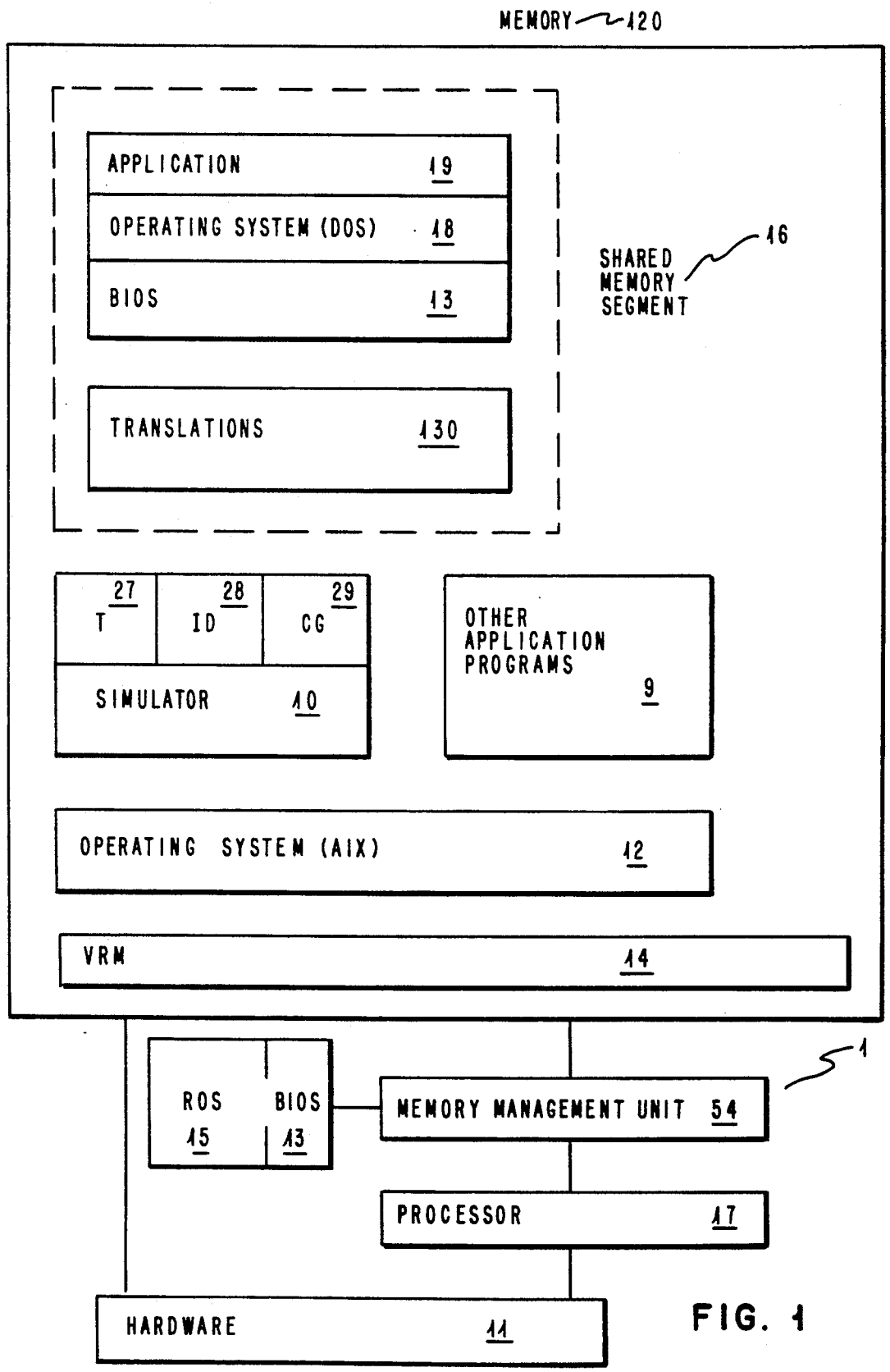
FIG. 1 is a block diagram showing the processing system environment of the preferred embodiment of this invention.

The preferred embodiment of the system and method of this invention simulates a processing system such as the IBM PC AT which utilizes an Intel 80286 processor having a complex instruction set, on a processing system 1 as shown in FIG. 1 such as the IBM RT PC which utilizes the ROMP processor having a reduced instruction set computer (RISC) technology. Although the RISC processor has less function per instruction, it can process instructions faster. The architectures between an Intel 80286 based machine and a RISC based machine are quite different from each other. The greater the difference there is between the architectures of two processing systems, the more difficult it is to simulate the one processor on the other processing system.

For more information on the RT PC processing system, the IBM PC AT processing system, and Intel's 80286 processor, the following references are suggested, and are hereby incorporated by reference. Bach, M. J. *The Design of the UNIX Operating System*, Prentice Hall, 1986. Lang, T. G. and Mothersole, T. L., *Design of the RT PC VRM Nucleus*, Sep. 1, 1986. *AIX Operating System Commands Reference*, Version 2.1, IBM Corporation, SC23-0790. *AIX Operating System Managing the AIX Operating System*, Version 2.1, IBM Corporation, SC23-0793. *AIX Operating System Programming Tools and Interfaces*, Version 2.1, IBM Corporation, SC23-0789. *AIX Operating System Technical Reference*, Version 2.1, Volumes 1 and 2, IBM Corporation, SC23-0808 and SC23-0809. *IBM RT Personal Computer Technology*, IBM Corporation, SA23-1057, 1986. *Virtual Resource Manager Technical Reference*, Version 2.1, Volumes 1 and 2, IBM Corporation, SC23-0816 and SC23-0817, *iAPX 286 Programmer's Reference Manual Including the iAPX 286 Numeric Supplement*, Intel, 210498-003,1985, and *IBM PC AT Technical Reference Manual*, IBM Corporation, March 1984.

Figure 2:
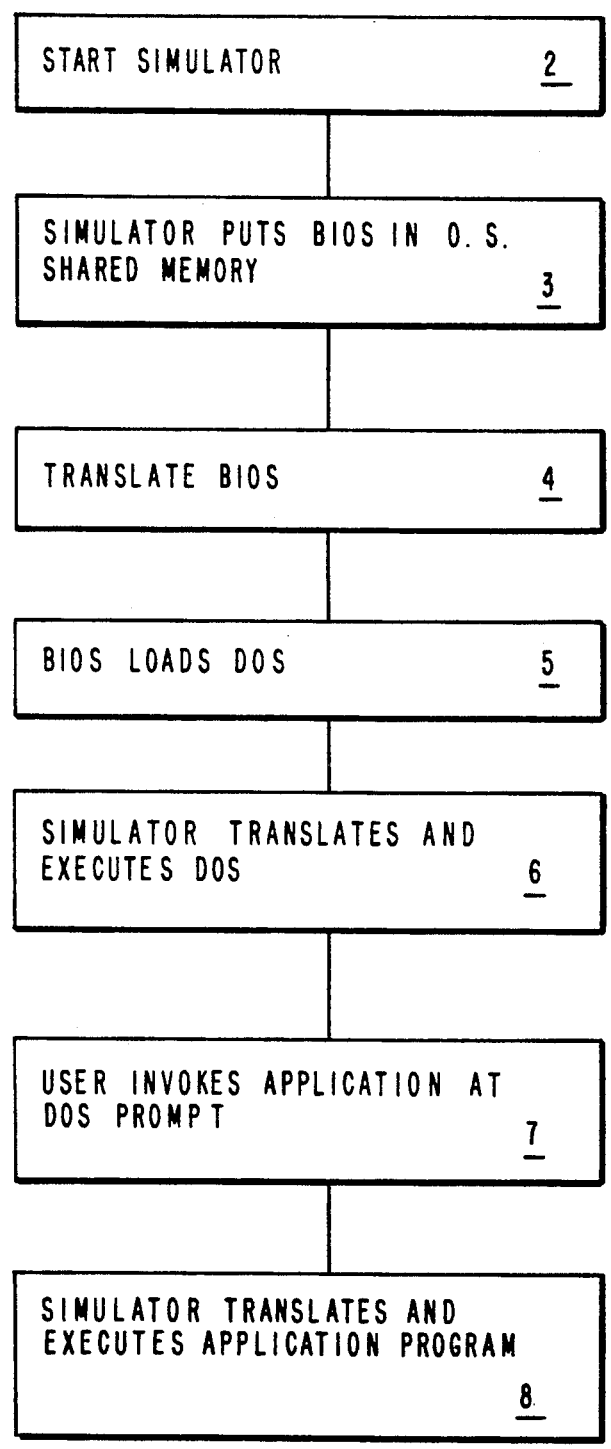
FIG. 2 is a flow chart showing the initial steps in starting the simulator of this invention.

As shown in FIG. 1, the simulator 10 runs as an application program on the operating system 12 of the processing system 1. Referring to FIG. 2 in addition to FIG. 1, as the simulator 10 is started, step 2, the simulator 10 copies BIOS 13 containing 80286 instructions from read only storage (ROS) 15, otherwise referred to as read only memory (ROM), into the operating system's 12 shared memory segment 16, step 3. The simulator 10 translates the BIOS 13, step 4, which loads the operating system (DOS) 18 for which the application 19 was originally written, step 5. The simulator 10 then translates and executes that operating system 18, step 6. A user invokes the application 19 at the operating system prompt, step 7, and the simulator 10 translates and executes the application program 19, step 8.

To increase the performance of the CPU simulation, i.e., reduce the average number of host instructions per simulated instruction, several key processing areas were identified that were currently utilizing more instructions than desired.

I. Condition Code Graph Analysis

First, the processing task of maintaining and keeping the correct values of the condition codes was identified.

Many processor instructions affect the flags register 20 (FIG. 3C) by updating the condition codes 21–26 in it to reflect the result of an operation. There are six different condition codes, the overflow flag 21, the sign flag 22, the zero flag 23, arithmetic flag 24 also known as the half carry, the parity flag 25, and the carry flag 26. These condition codes 21–26 indicate common conditions such as whether the result was zero, whether it was negative, whether a carry out of a register occurred, or whether an overflow condition resulted. It also includes conditions that indicate the parity (even or odd) of the lower byte of the result and the carry out of the lower 4 bits of the operation (half carry).

To simulate a first processor instruction set by keeping an up to date version of the first processor flag register would require additional cycles for every instruction that affects the register. This is especially true if the architecture of the first processor defines several different combinations of condition code updates. For example, the condition codes may be always set or cleared, computed, left unchanged, or left undefined.

A previous simulator RSIM, the RT PC processor simulator on IBM S/370, used a scheme to reduce the overhead of keeping track of the condition codes. Registers were reserved for this purpose. The reserved register contained the 32 bit values involved in an operation, and the type of operation performed. The idea was to postpone the work of determining the value of the condition code until an instruction that actually requires it is simulated. Nevertheless, there is still the overhead of saving away these values and types. This overhead is unnecessary if all possible subsequent paths contain an instruction which modifies the same condition codes without any intervening instruction needing them.

Figure 3A:
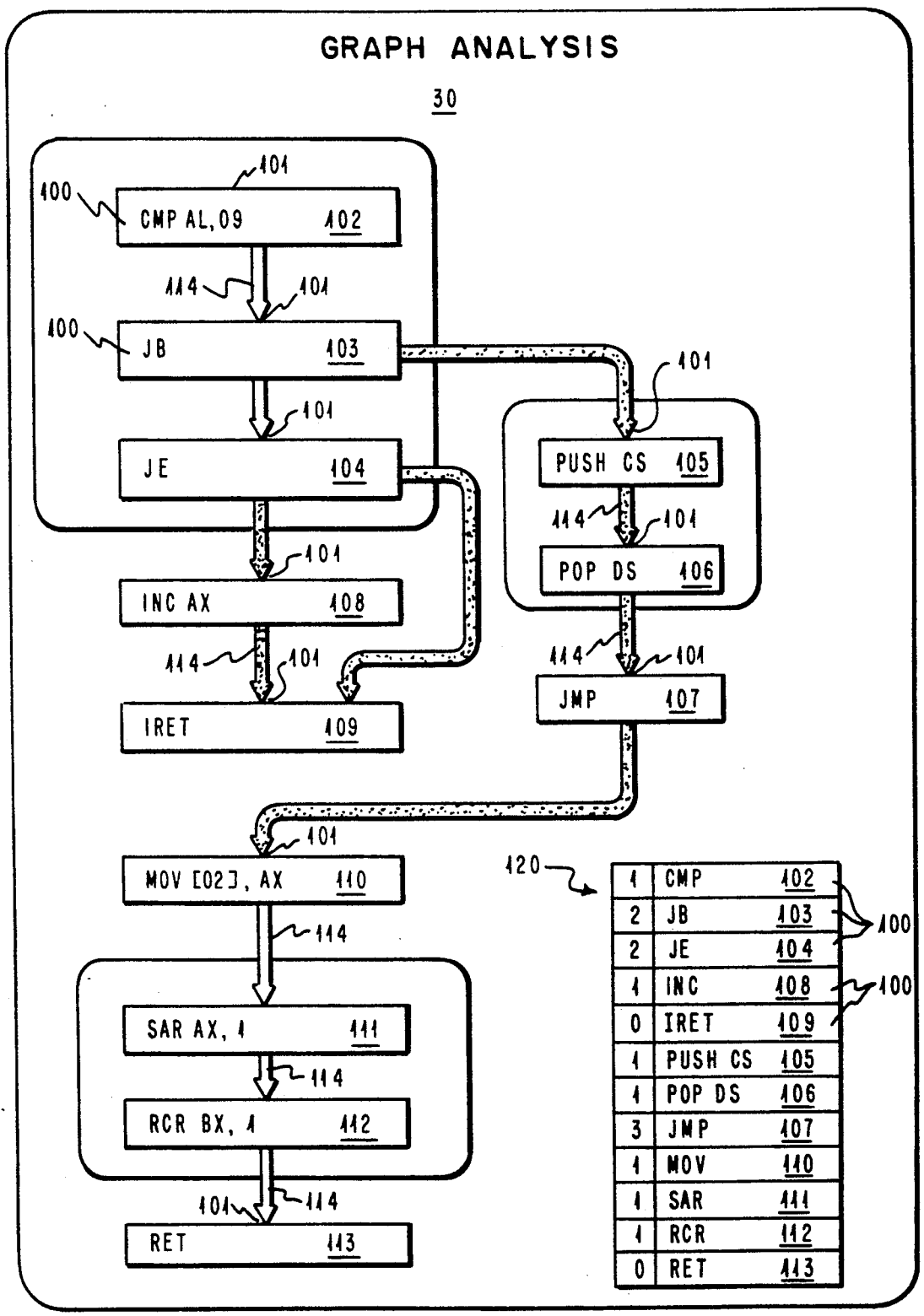
FIG. 3A shows a graph analysis of a sample flow of control of first processor instructions that are to be translated by the simulator of this invention.
Figure 3C:
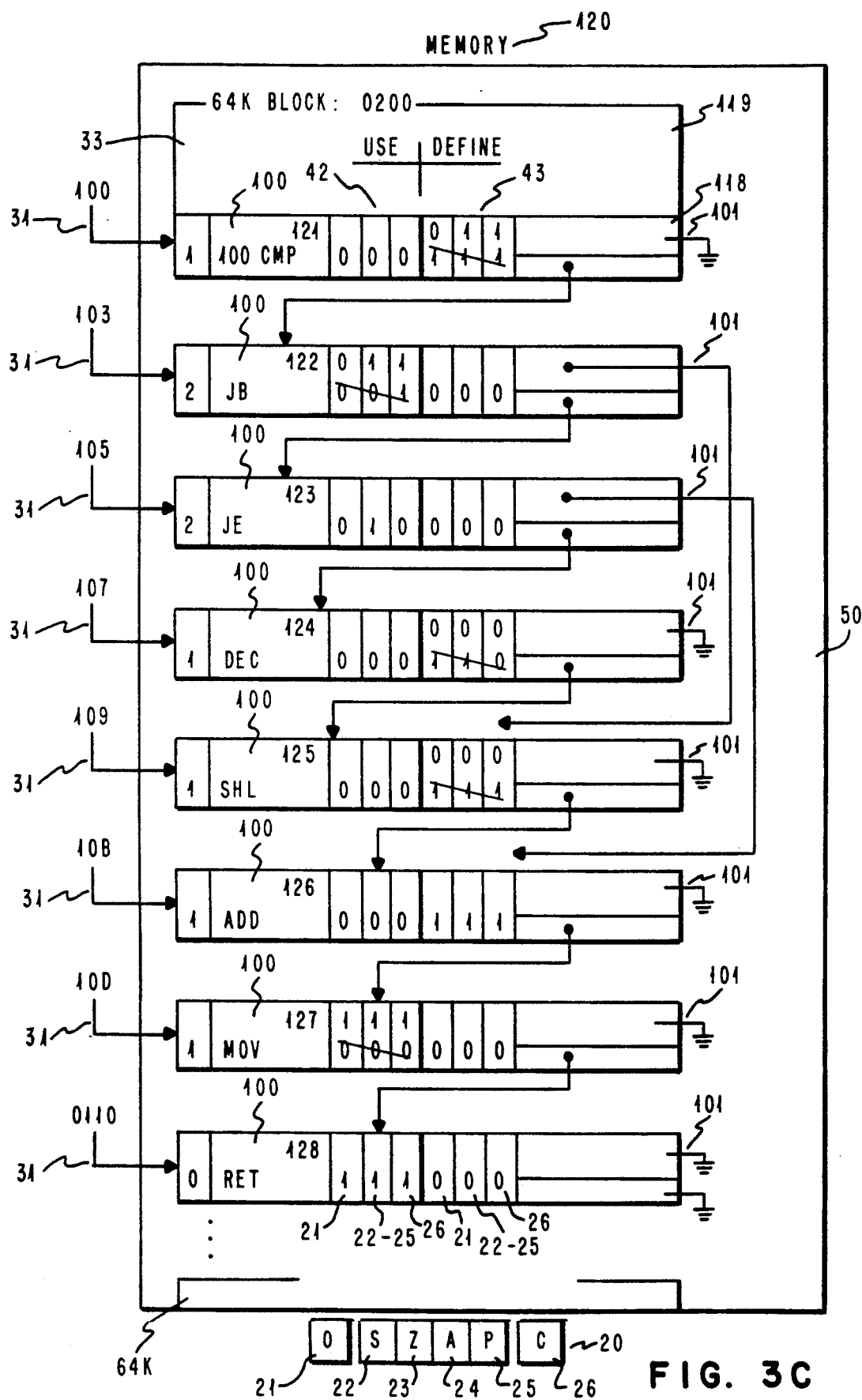
FIG. 3C illustrates a graph analysis of the condition codes in the flow of control of the first processor instructions shown in FIG. 3B.

In order to determine which modifications of the flag register 20 actually were used by subsequent instructions, the simulator 10 of this invention relies on information provided by a graph analysis 30, FIG. 3A, or 50, FIG. 3C of a block of first processor instructions 100. These techniques were previously applied in optimizing high level language compilers. However, it is believed that this is the first time that this technique has been applied to the problem of processor simulation.

Figures 4, 5:
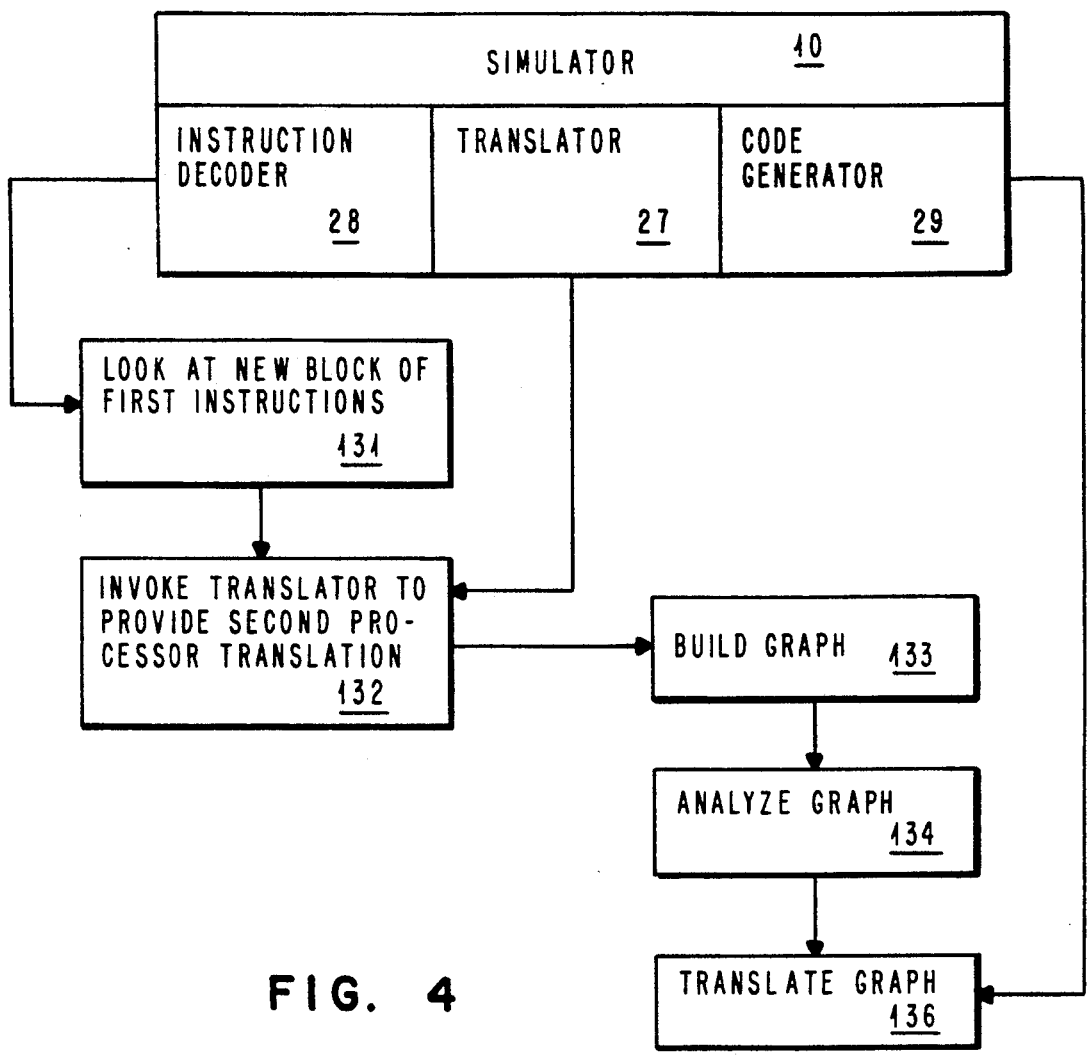
FIG. 4 is a flow chart of the translation.
FIG. 5 is the program code used in the first method of the three tier approach for determining the translated instruction address of the next executable instruction.

When the simulator 10 reaches a new block of first processor instructions 100, step 131, FIG. 4, the simulator 10 invokes the translator 27 to provide a second processor translation, step 132. The translation occurs in three phases.

First, a graph 50, FIG. 3C, is built, step 133, FIG. 4, which represents the structure of the block of first processor instructions 100. Each node 101 in the graph corresponds to one instruction 100. A first processor instruction decoder 28 fills in each node 101 with information about the instruction 100 including which registers and condition codes 21-26 the instruction 100 needs, block 42, in order to execute, and which condition codes 21-26 the instruction 100 sets, block 43, as a result of executing. It will be noted that the use register 42 and the set register 43 have a separate bit for the overflow flag 21 and the carry flag 26, and groups the remaining condition codes 22-25 together in one bit. Therefore if any of these condition codes 22-25 are used or set by an instruction 100, the middle bit of registers 42, 43 will so indicate.

Second, step 134, FIG. 4, the graph 30 is analyzed to determine where interrupts must be polled, how to order the translations so as to minimize branching, and which condition codes defined by an instruction are actually used.

Figures 3D, 10:
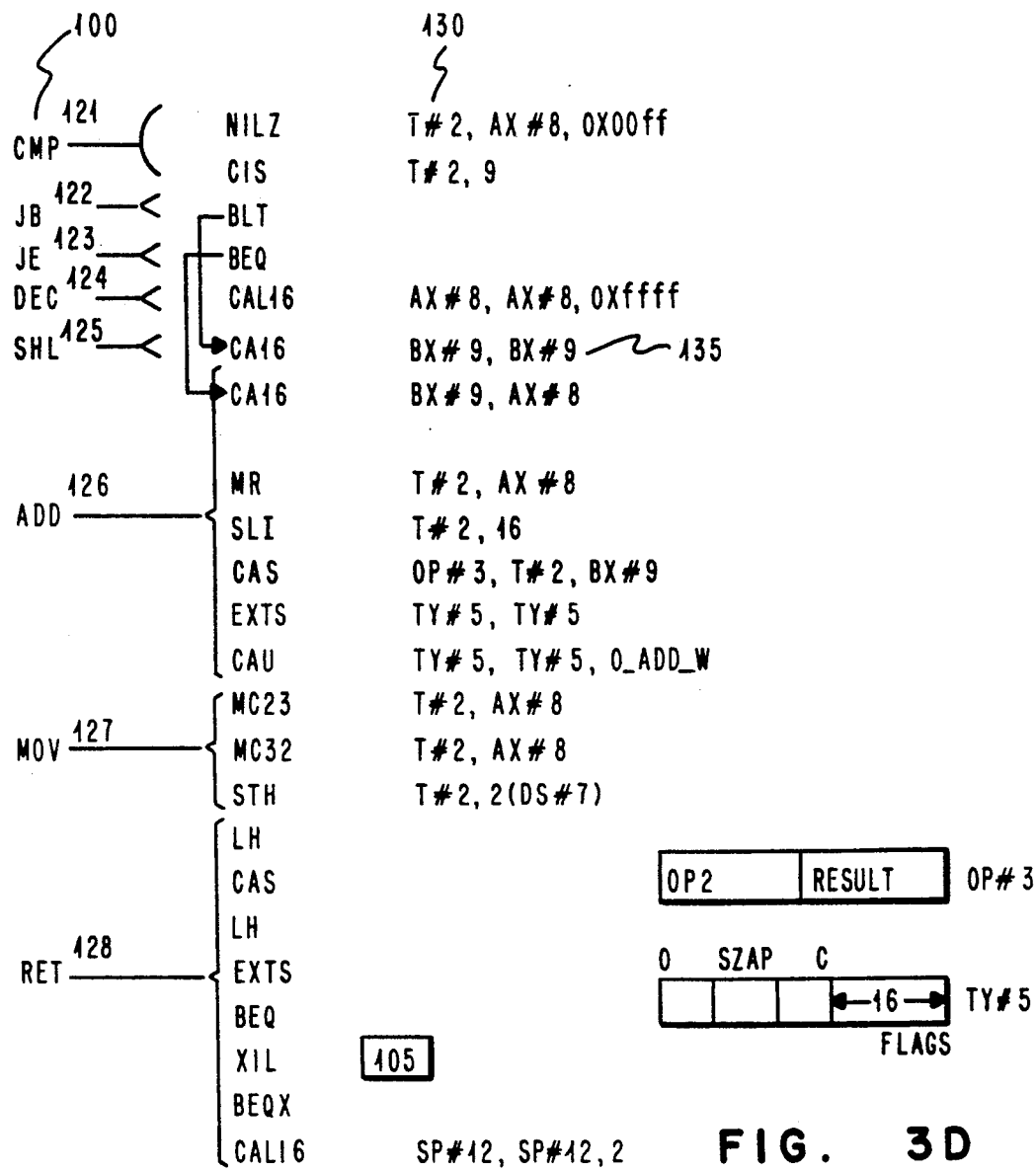
FIG. 3D illustrates the flow of control of second processor instructions translated from the graph analysis of FIG. 3C.
FIG. 10 is the program code used to find the corresponding byte in the status table of a memory location in either shared memory or on an adapter.

Third, step 136, FIG. 4, the code generator 29 is invoked to translate the graph 30 into second processor instructions 130, FIG. 3D.

At the time of code generation, step 136, the information in the graph 50 will indicate if the condition codes 21-26 defined by an instruction are actually used. For example, in a majority of cases, the condition codes defined by a shift (SHL) instruction 125, FIG. 3B, 3C are not actually used. The code generator 29 can use this knowledge and generate a single second processor instruction 135, FIG. 3D where four or five instructions may have been required to save the operands of the operation if the condition codes were needed. It is seen in the flow of control of the instructions 100 of FIG. 3B, 3C that the condition codes 21-26 for the ADD instruction 126 were needed in a subsequent instruction 128 in this example. Consequently, the translated instructions 130, FIG. 3D, resulted in six instructions instead of just one instruction had they not been needed. Nevertheless, should the graph analysis 50 indicate that the condition codes 21-26 are not needed, the extra translated instructions are not generated.

The simulator 10 translates first processor instructions 100 into second processor instructions 130, but does not do the translating one instruction at a time. The simulator 10 examines the first instruction that is about to be executed, and for which there is no translation, and continues examining subsequent instructions while building a graph 30 of those instructions as shown in FIG. 3A.

Each node 101 in the graph 30 corresponds to one first processor instruction 100. Each node 101 can have at most two descendants. In the case of sequential instructions 102, 105, 106, 108, 110, 111, 112, which transfer control only to the next sequential instruction in memory, the nodes 101 have only one descendant 103, 106, 107, 109, 111, 112, 113, respectively, as shown in FIG. 3A as a vertical line 114. There can be two descendants in the case of conditional branch instructions 103, 104, which test for a condition and branch to one instruction if the condition is true, and continues with the next instruction if the condition is false. It is possible for a node 101 to have no descendants, as is the case for the interrupt return instruction 109. The instruction 109 that has no descendants illustrates an instruction that transfers control dynamically. Also, a node 101 can have one descendant that is not a sequential instruction. The unconditional jump instruction 107 is an example of this.

As shown above, there are four types of instructions 100. These types are numbered in the code as at the node has no descendents, i.e., the return instruction 128 FIG. 3C, the interrupt return instruction 109, FIG. 3A, and the return instruction 113, FIG. 3A. A node 101 is numbered "1" if it is a sequential instruction and has one sequential descendent; e.g., compare instruction 121, decrement instruction 124, FIG. 3C, compare instruction 102, increment instruction 108, FIG. 3A. A node 101 is numbered "2" if the instruction has two descendents i.e., jump if below instruction 122, FIG. 3C, and 103, FIG. 3A. A node 101 is numbered "3" if the instruction is not a sequential instruction, but has only one descendent, i.e. jump instruction 107, FIG. 3A.

Having built a graph 50, FIG. 3C, that describes the block of first processor instructions 100, FIG. 3B, one node 101 per instruction 100, the simulator does an analysis of the graph 50. Each node 101 contains information on which condition codes 21-26 a first processor instruction 100 normally needs for execution, register 42, and which condition codes 21-26 are set, register 43, by that instruction after executing. In the case of the compare instruction 121, the compare instruction 121 does not need any condition codes 21-26 to execute, but it will set all of them, register 43. The jump if below (JB) instruction 122 needs the carry condition code 26 in order to execute because that is the condition being tested, register 42, but the JB instruction 122 does not set any condition codes after executing, register 43. The jump if equal (JE) 123 instruction needs the equal condition code bit in order to execute, but the JE instruction 123 does not set any condition codes after executing. The decrement instruction 124 sets the overflow flag 21 and the arithmetic flags 24, register 43, and leaves the carry condition code 26 unchanged, register 43. The graph analysis continues in this fashion for each of the rest of the instructions 100.

The nodes 101 are allocated in storage 120 sequentially as the application program 19 finds them. The search through the application program 19 originally written for the first processor is called a depth first search. The depth first search means that the instructions are searched sequentially until an end node (Type 0); e.g., the IRET instruction 109 FIG. 3A is reached.

After a type zero node is reached, the search returns to the last instruction that had more than one descendent.

The order of instructions 100 FIG. 3A, stored in memory 120 would be compare 102, jump below 103, jump if equal 104, increment 108, and interrupt return 109. After the interrupt return 109, the search would go back to the jump if equal instruction 104 and examine the second descendent. The second descendent, interrupt return 109 is an instruction that is already stored in memory. Therefore, the search returns to the next previous node that had two descendents, the jump if below 103, and follows the second path. New code is then found in this path. The next instructions are stored in memory in order as shown in FIG. 3A.

Referring to FIG. 3B and 3C, for each of the nodes 101, the simulator keeps two fields in memory, one is the condition codes 21-26 that are needed by that instruction 100, register 42, the other is the condition codes 21-26 that are set by that instruction 100, register 43. At that point a propagation process is performed to optimize which condition codes must be set. This is accomplished by going from the last instruction allocated to the first instruction allocated. In this order, instructions are taken out of a circular queue. The register 42 of a node 101 is updated by ANDing the compliment of register 43 of that node with register 42 of all descendant nodes, and then ORing this result into the register 42 of a node 101 being updated. The updated register 42 reflects the descendants' needs for condition codes 21-26. If all descendants are marked done, then so is this node 101 being updated, and the node 101 is taken out of the queue. If the node is not done, the instruction is put at the end of the queue. The queue is gone through until the queue is empty indicating all of the nodes have been processed, or there are some remaining nodes in the queue that nothing has changed, i.e. a node has not been updated.

A second pass is performed through the graph. In this pass, the register 43 is updated by reducing the condition codes set to acknowledge those that are now shown as being needed by its descendants.

At the end of this analysis, each node 101 indicates which condition codes 21-26 must be set, register 43. The number of condition codes 21-26 could be less than the number initially set by that instruction. The set of condition codes will include only those condition codes that will be used by subsequent instructions. For example, the return instruction 128 indicates in register 42 that it will use all of the condition codes 21-26 as a precautionary measure since the subsequent instructions are not known until execution. The move instruction 127 typically does not use, register 42, the condition codes 21-26, but indicates a use, register 42, since the subsequent return instruction 128 needs them. The add instruction 126 does not use the condition codes 21-26, register 42, but sets all of them, register 43, which then can be used subsequently. The shift instruction 125 normally sets, register 43, all of the condition codes 21-26, but does not need to in this case since the subsequent add instruction 126 does not use them. It was already analyzed that the add instruction 126 would set the condition codes 21-26 for subsequent use. This analysis for updating the use register 42 and the set register 43 continues in reverse order through the list of instructions 100 previously stored in a specified order to perform the graph analysis.

As seen in FIG. 3D, the translation 130 required only one instruction each for the decrement instruction 124 and the shift instruction 125, FIG. 3C. In contrast, the add instruction 126 that set the condition codes 21-26 for subsequent use took six instructions.

Likewise, the graph analysis 30 of FIG. 3A would also show that the compare instruction, which sets all of the condition codes, only needs two of the six condition codes in subsequent instructions, the zero bit used by the jump if equal (JE) instruction 104, and the carry bit used by the jump if below (JB) instruction 103. None of the other condition codes are needed. Furthermore, no descendent of the conditional branches shown in FIG. 3A needs the other condition codes. Therefore the simulator can translate the block of the three instructions 102, 103, 104 as a single unit without having to be concerned with setting the condition codes. Therefore the number of instructions that require the preservation of the corresponding condition codes are reduced.

By applying the previous compiler technique of graph analysis to a processor simulator, essential knowledge is gained about the use of condition codes by subsequent instructions. The code generator 29 which translates first processor instructions 100 into second processor instructions 130 uses the condition code information to produce in many cases a single second processor translated instruction. This reduces the unnecessary cycles if the flags register had been kept up to date after every instruction, and improves the performance of the simulator.

Besides utilizing the results from a graph analysis to obtain fewer translated instructions to simulate the flow of control, the results from a graph analysis can be used in the process of minimization of interrupt polling as disclosed in Ser. No. 07/151,123 Feb. 1, 1988 for A SYSTEM AND METHOD FOR SIMULATING THE I/O OF A PROCESSING SYSTEM, currently co-pending, and assigned to the same assignee as the present invention, which is hereby incorporated by reference.

II. Instruction Address Translation

The simulator in the preferred embodiment of this invention translates the instructions of Intel's iAPX 80286 processor (first processor) used in the IBM PC AT into simulator instructions of the ROMP processor (second processor) used in the IBM RT PC. These translations are saved for reuse when the application program originally written for the simulated first processor transfers control to that same address again. For instructions that do not transfer control, determining the next instruction pointer (IP) is accomplished by adding the length of the instruction to the instruction's instruction pointer (IP). A similar sequence of sequential simulator instructions are generated by the simulator. Because the instructions follow sequentially, locating the corresponding translations is not required.

Another class of instructions transfers control statically. That is, the new instruction pointer is computed by adding or subtracting a fixed displacement from the instruction's pointer. These are known as relative branches. The simulator generates second processor relative branches to the corresponding translation.

The instruction set contains three instructions that transfer control within a code segment to a new instruction pointer which cannot be determined statically since it is loaded from a register or memory at run time. The RETurn from subroutine instruction is one of these. The speed with which this instruction is simulated affects the overall performance of the simulator, especially if a processing system spends more time executing a RETurn instruction than any other instruction. The other two instructions are the JuMP indirect and the CALL indirect (register or memory). They will be treated the same as the RETurn instruction.

For example, a first processor addresses instructions by using two registers. The code segment register 33, FIG. 3B describes the location of a 64K block 119 of memory 120, FIG. 3C. The instruction pointer register 31, FIG. 3B, is an offset into that code segment 33. The instruction pointer 31 describes at which of the 64K bytes the instruction 100 is located. The first processor addresses instructions by indexing into a code segment 33 with the instruction pointer 31, FIG. 3C.

Figure 6:
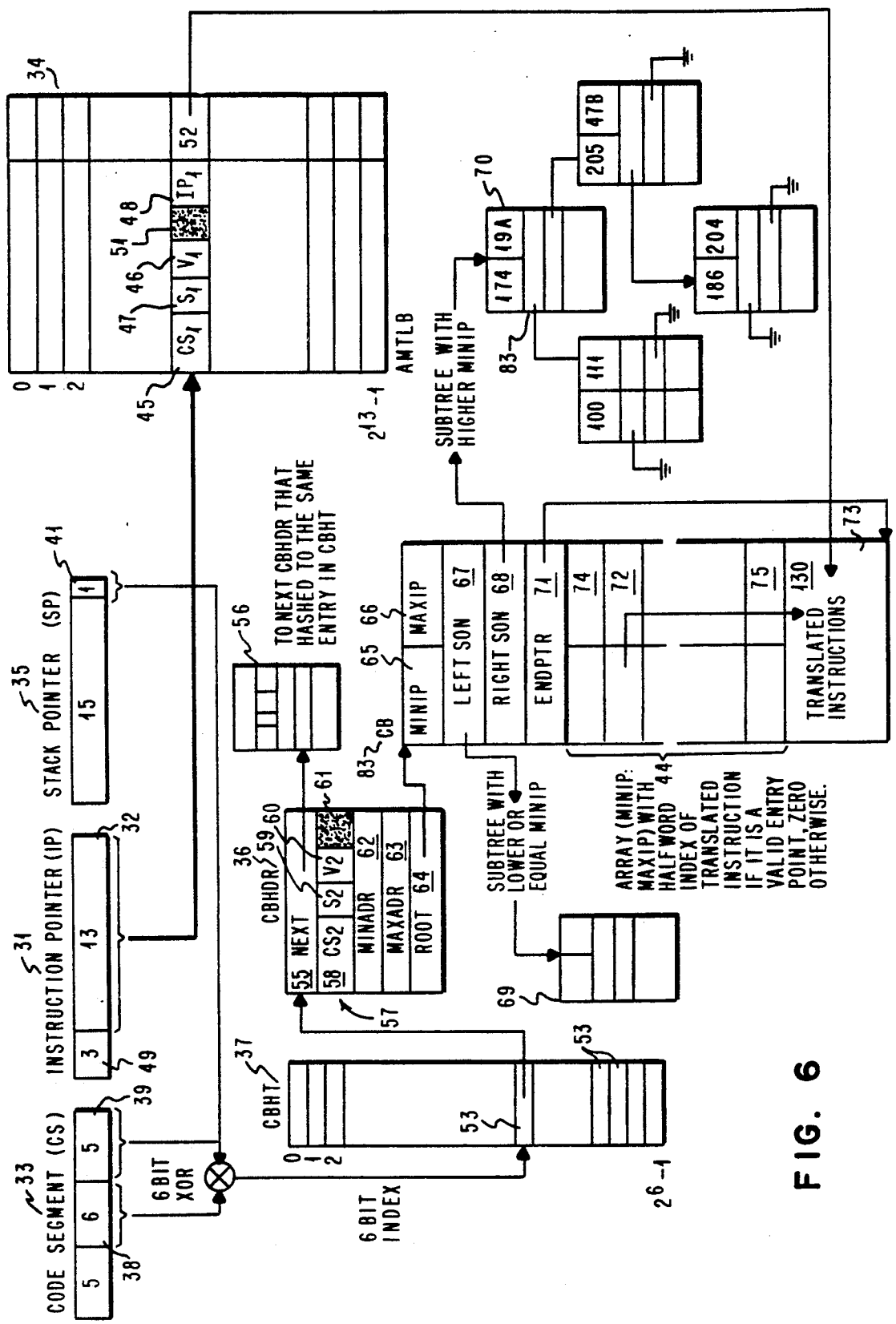
FIG. 6 shows the data structures of the second and third approaches for determining the translated instruction address of the next executable instruction by mapping an instruction of one instruction set to a corresponding translation address of a simulator having a different instruction set.

The simulator of this invention uses the data structures shown in FIG. 6 to map first processor instruction addresses 100 which consist of a code segment 33 and an instruction pointer 31 to the address in memory 120 of the corresponding second processor where a sequence of second processor instructions 130 perform the same function.

In the method of this invention, a new instruction pointer 31, and code segment 33, whose values are determined at run time, are converted into the simulator machine (second processor) address of the corresponding translation for those instructions that transfer control dynamically, such as the RETurn from subroutine instruction, JuMP indirect, and the CALL indirect, or software interrupt instructions.

The simulator uses a three tier approach (FIG. 7) to simulate these three instructions that transfer control dynamically. The three tier approach is organized in succession. The fastest and most likely case is performed first. The second approach is used should the first approach fail. The third approach is the slowest approach which guarantees a successful conversion of the instruction pointer to an address of the simulator machine. FIG. 6 illustrates the second and third approaches.

Figure 7:
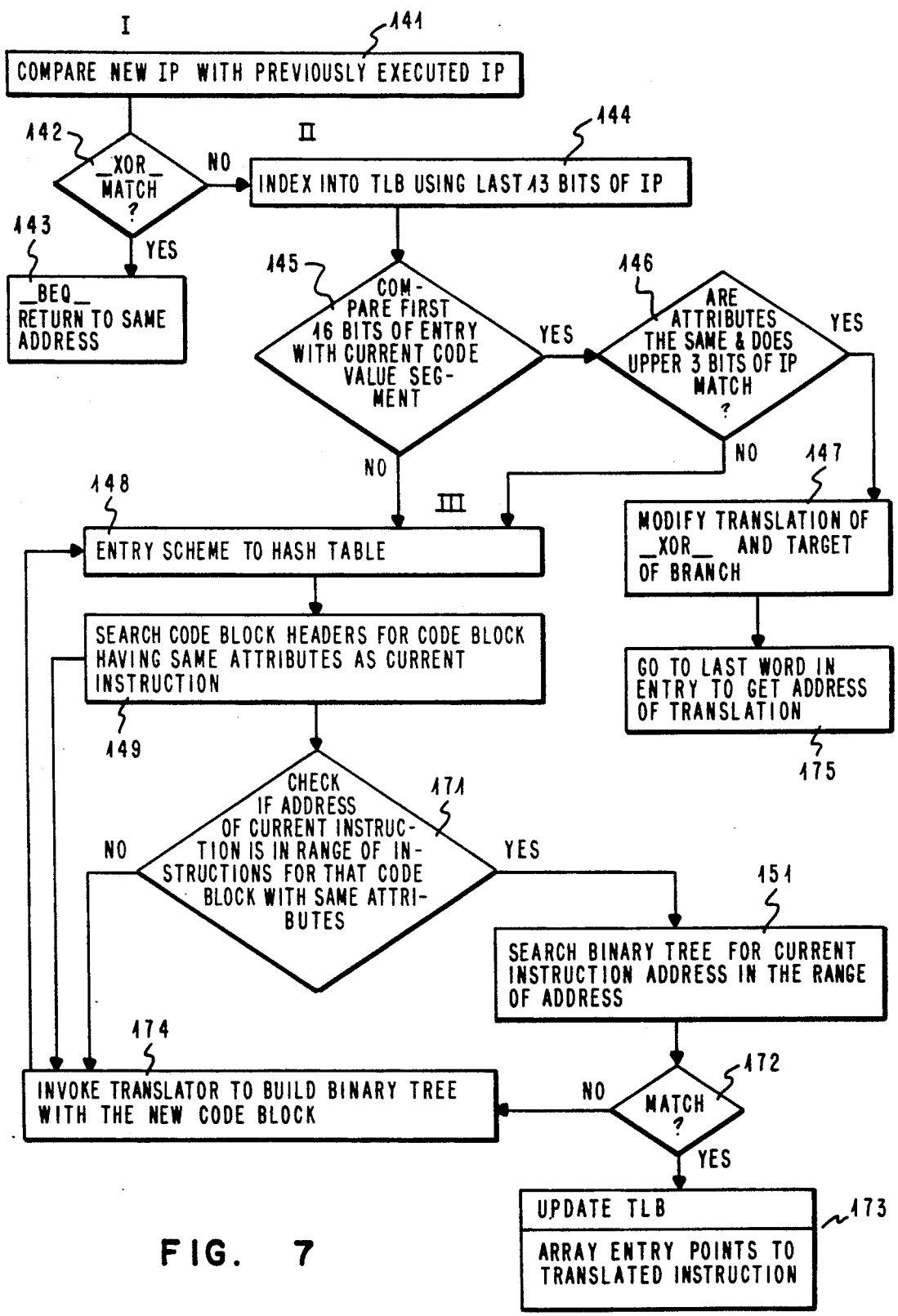
FIG. 7 is a flow chart of the three tier approach for determining the translated instruction address of the next executable instruction.

Referring to FIGS. 5 and 7, the first operation performed on the new instruction pointer is to compare it with the value produced by the previous execution of that instruction, step 141. If the values match, a simulator machine relative branch is performed to the corresponding address. An exclusive OR operation determines if the values match, stp 142, and a conditional branch transfers control if they do, step 143. This allows for a fast computation of the look up address. In the event that the look up is successful, the XIL and BEQ instructions are modified accordingly. The value to be EXCLUSIVE ORed by XIL will contain the new instruction pointer, and the relative offset for the branch instruction will indicate the new target address. Control is transferred to the new target.

Referring to FIGS. 6 and 7, should the above approach fail, i.e, the instruction pointer 31 is different from the previous time that particular instruction had executed, a table look up is performed using the address mapping translate look-aside buffer 34 which is similar to a hardware translate look aside buffer. The conversion from a first processor instruction to a second processor instruction uses the method described below.

Second processor instructions 130, when translated, assume certain values of first processor registers, called attributes. These attributes can be used by the translator to generate more efficient code in certain cases. For example, if the stack alignment is even, half word instructions can be used to transfer data to and from the stack. Otherwise, two separate byte instructions must be used. The value of the code segment 33 and the alignment of the stack pointer 35 for a block of first processor instructions 100 are known as the attributes of the block. Both the code segment 33 and the stack pointer 35 are 16 bit fields. The attributes occur in the code block header 36, and the address mapping translate look-aside buffer 34. Translations 130 of first processor instructions 100 with different attributes are kept separate.

The method takes the lower thirteen bits 32 of the instruction pointer 31 and uses this as an index into the table 34 which is aligned at a 64K byte boundary at a fixed virtual address, step 144. The entry contains two words. The first word contains the attributes. The first 16 bits CS1 45 are the value of the code segment 33, the next bit 47 contains the alignment of the stack pointer 35 denoted as S1, the next bit 46 denoted as V1 is a valid bit which is zero if the entry is not valid, and one if it is a valid entry. There are some unused bits 51. The last 3 bits 48 of the 32 bit word are the upper three bits 49 of the instruction pointer 31 denoted as IP1.

Therefore, the method is to index the address mapping table 34 with the lower 13 bits 32 of the instruction pointer 31, step 144, and compare the first 16 bits CS1 45 with the current value of the code segment 33, step 145. This indicates that the instructions are in the same code segment indicating that the previous instruction may have been executed recently. If that matches, the lower bit 41 of the stack pointer 35 is compared with S1 47, to insure that the assumptions made in the translations about the alignment of the stack are not violated, step 146. If this matches, and V1 46 is on indicating a valid entry, and IP1 48 matches the upper 3 bits 49 of the instruction pointer 31, then there is a hit in the addressing mapping translate look-aside table. That is, the current instruction is exactly identified with an earlier translated second processor instruction. The next word 52 is a 32 bit address of the second processor instructions 130 that simulate the first processor instruction 100, step 175. If there is a miss, i.e., anyone of the above comparisons fails, translation proceeds by accessing the hash table 37 as described in the third approach below, and the address mapping translate look-aside buffer 34 entry is updated with the new attributes and the new branch address for future reference.

The third approach also is shown in FIGS. 6 and 7. The middle six bits 38 of the code segment 33 are XOR'ed with the concatenation of the lower five bits 39 of the code segment 33 and the lower bit 41 of the stack pointer 35. That gives a six bit index into the code block hash table 37, step 148. The code block hash table has 64 entries. Each entry 53 points either to a null which indicates there is no entry, and implies a new translation is needed, step 174, or contains a pointer to a code block header 36.

Each code block header 36 describes the available second processor translations for a given attribute. The first field 55 in the code block header 36 contains a pointer to the next code block header 56 that hashed to that same entry 53 in the code block hash table 37. The next field 57 contains the attributes of the code block. The attributes include the code segment 33 in block 58 identified as CS2, and the alignment of the stack pointer 35 in block S2 59. For simplicity, the valid bit V1 46 is repeated as V2 60. The code block headers 36 are searched for the code block header 36 that has the same attributes as the instruction executing at run time, step 149. The next two fields 62, 63, contain the minimum and maximum first processor addresses for which there are translations with these attributes. The next field 64 is a pointer to the root of a tree that describes all the code blocks 83 for which there are translations with the specific attribute.

Each of the nodes of the tree, i.e. code block 83, contains minimum and maximum instruction pointers 65, 66 for which there is a second processor translation 130 within a range of first processor instruction pointers 31. There is a pointer to the left and right son 67, 68, respectively. The left son 67 points to a subtree 69 with lower or equal minimum instruction pointers 31. The right son 68 points to a subtree 70 with higher minimum instruction pointers 31. The nodes of the tree are searched to find the subtree having a range of instruction addresses within which the current instruction address falls, step 151. The next field 71 is a pointer to the end 73 of the code block 83 of second processor translations 130.

There is an array 44 with as many entries 72 as there are in the range of instruction pointers 31, i.e. the lower bound of the array 44 is the minimum instruction pointer, and the maximum bound of the array 44 is the maximum instruction pointer. Each of these entries in array 44 contain either 0 which indicates a first processor instruction 100 for which there is no second processor translation, or a pointer if it corresponds to a valid first processor instruction entry point. Each entry in the array 44 is a half-word. If there is a valid entry, the entry contains the offset from the beginning of the array 44 to the appropriate entry point for that particular instruction pointer, step 173.

In summary, the table look up fails in the unlikely event that two instruction pointers hash to the same entry in the table, or if this is the first time that the application program is transferring control to that instruction pointer. In either case, the simulator will access slower data structures, i.e., the binary tree 83, to convert the address. If not found, the translator 27 is invoked to generate simulator machine (second processor) equivalent instructions for the new block of first processor instructions, step 174, and the translate lookaside buffer 34, and the code block 82 are updated.

III. Memory Mapping

Figure 8:
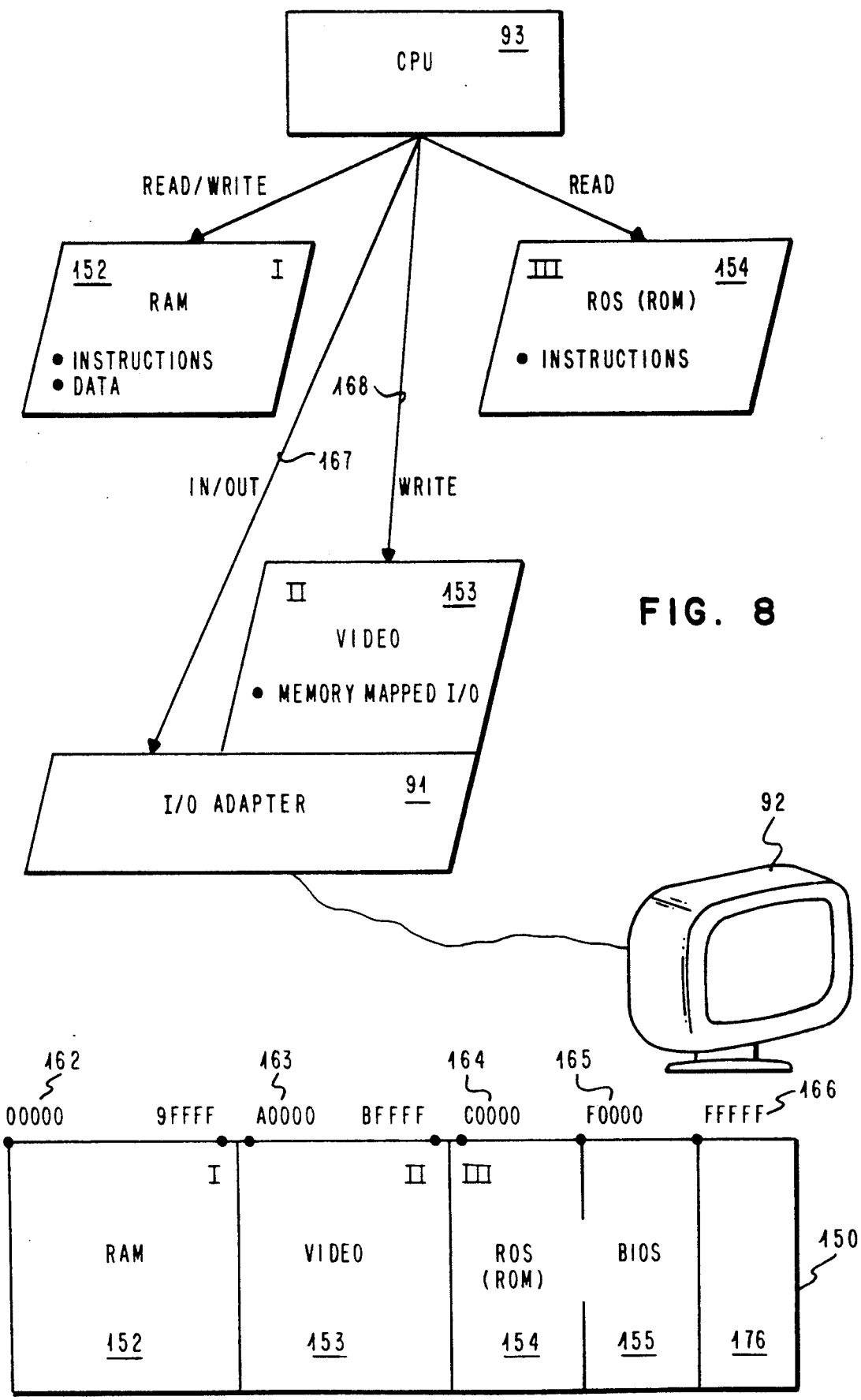
FIG. 8 is a block diagram showing the types and contents of the memory of a processing system.

Referring to FIG. 8, the memory of a processing system 1 can be classified by type and contents. Region I is random access memory (RAM) 152. The contents of RAM 152 are instructions and data. The CPU 93 can read and write to this region of memory.

The second region of memory is called adapter memory (video) 153. The CPU can use explicit IN/OUT instructions to directly access the I/O adapter 91 connected to an output device 92, such as a display, shown as line 167, or the CPU 93 can use memory instructions to access the I/O adapter 91 through a video buffer 153. Using memory instructions to a video buffer 153 for output to a device 92 is referred to as memory mapped I/O since it really is I/O going to an adapter, although through a memory location. Memory mapped I/O allows a wider range of instructions to be used since the CPU has more instructions that go to memory than it has to perform explicit I/O (IN/OUT instructions). The contents of the video range of memory is output data, i.e. memory mapped I/O.

The third type of memory is region III called read only storage (ROS) 154, otherwise referred to as read only memory (ROM). The contents of ROS 154 is mostly instructions, although there could be data also. In either case, the contents of ROS is never modified.

The address space 150 of a processing system such as the IBM PC AT divides logically into these three areas. The first is a 640K byte region of processor Read/Write storage, i.e. RAM 152. The second is a 256K byte region reserved for I/O adapters, i.e. video 153. These include data buffers for devices and device dependent ROS. The third is a 128K byte region of processor ROS 154. This ROS contains BIOS and Basic. There is memory above the 1 meg range 166 that follows the BIOS area 155. Since, the simulator of this preferred embodiment does not support the 286 protected mode, this area 176 of memory 150 is not provided for.

In order to translate the addresses of a first processing system into the addresses of a second processing system, the memory of the first processing system must be mapped into the memory of the second processing system.

Figure 9:
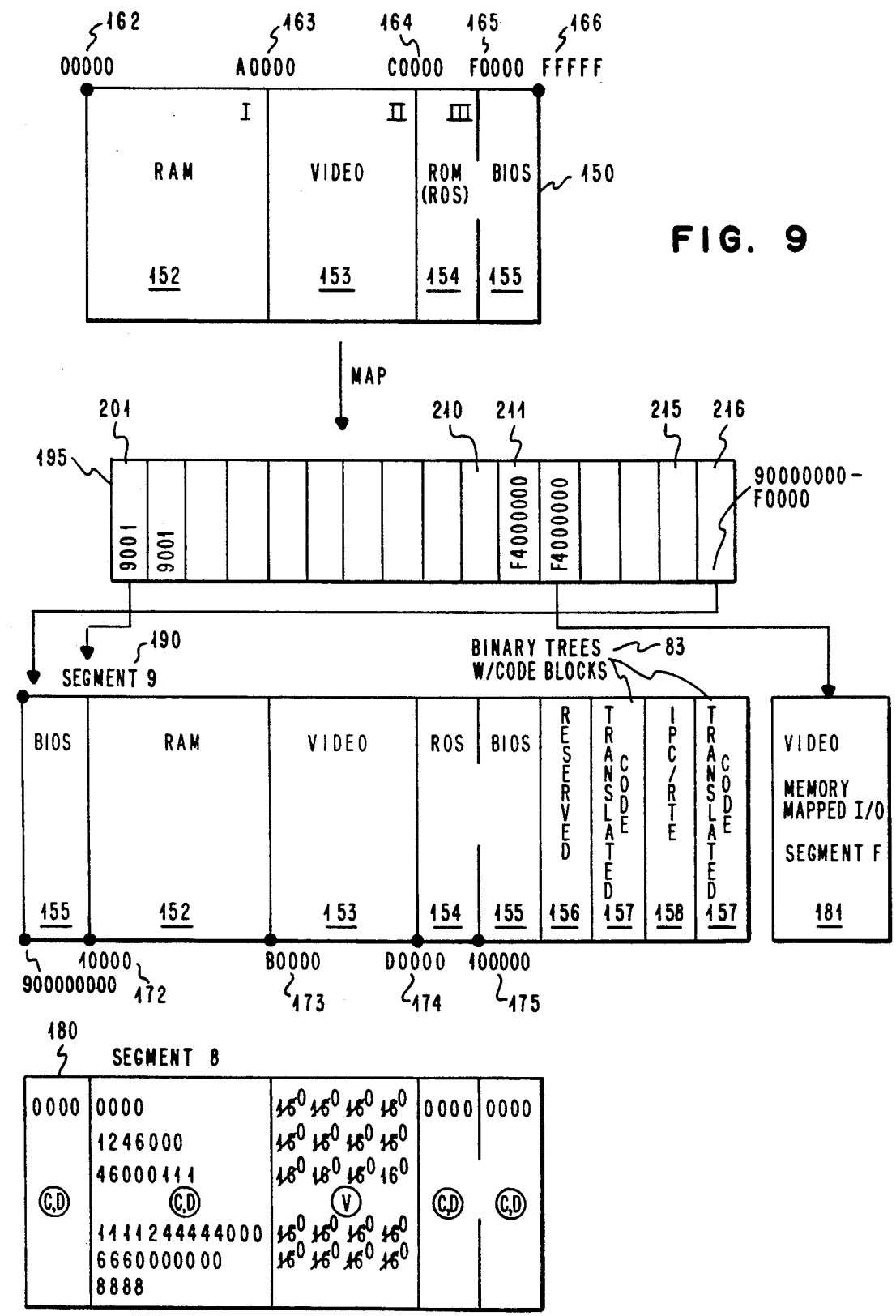
FIG. 9 illustrates the mapping of the memory of the first processing system into the memory of a second processing system, and a status table for indicating the type of contents of a store to memory.

To map memory, two shared memory segments 190, 180 (FIG. 9) of the operating system of the second processing system are used. The first shared memory segment 190 is used to store an image 150 of the memory of the first processing system. The second shared memory segment 180 indicates for each memory location the type of contents contained in that image.

In the second processing system memory 190, there is the 640K bytes of memory 152 that would reside in the first processing system, followed by the video range 153, followed by an area 154 for ROS (read only storage), followed by the area 155 for BIOS. In front of the first memory segment 152, the BIOS area 155 is replicated. This was done to simplify the mapping in the case where an application could load a segment register in the ROM 155 area of memory 150 such that the offset would wrap around to RAM 152. Therefore, the hexadecimal addresses 172-175 of these areas are offset into the shared memory segment 190, referred to as segment 0x9, by 64K from the address of the areas in memory 150 of the first processing system.

As a result, a virtual memory segment in the processing system running the simulator is dedicated to contain an image of all PC AT processor storage consisting of region one 152, and two copies of region three 154. Region two 153 will not be present when the second processing system has the output devices from the first processing system attached to it. If the output devices of the first processing system are not attached, an image of region two 153 will also exist.

The address locations 172-176 in memory segment 190 are the location of the actual first processing system memory image. This area 172-176 would look like the architecture of the first processing system being simulated and the memory available.

In addition to the memory image 172-176, the translated code 130 is stored in area 157. After the translated instructions are generated by the graph analysis 30 (FIGS. 3A, 3B, 3C, 3D) examining the instructions 100 of the first processing system that is being simulated, the translated instructions 130 are stored in area 157.

The next area 158 of the shared memory segment 190 is an inter process communications area and run time environment area where routines that are called at run time are stored.

In addition to the virtual shared memory segment 190 referred to as segment 0x9, the processing system running the simulator reserves a special segment for I/O bus memory referred to as segment 0xF, 181. Data is written into segment 0xF of the second processing system if the second processing system has the output device of the first processing system attached to it. An address location of the first processing system that falls within region II, 153, will have a corresponding memory location in segment 0x9, 190, or to segment 0xF, 181, of the second processing system.

The system and method of the simulator of this invention utilizes a relocate table 195 to map the memory 150 of the first processing system into either segment 0x9, 190, or segment 0xF, 181 of the second processing system. A first processing system such as the PC AT addresses memory locations by two components, a segment and an offset. In the PC AT, the segment is a 16 bit value that points to a 64K block of memory. The offset is also 16 bits, and gives the displacement within the segment. The address of the segment is computed by multiplying the segment value by 16.

The simulator utilizes a table 195 with 16 entries 201-216, each entry having 32 bits, to map the memory address of a PC AT into the 32 bit memory address of a IBM RT PC. The upper 4 bits of a segment of a PC AT memory address identifies one of the 16 entries of the table. The simulator separates the memory addressing computation into two parts. First, at the time that the segment register is loaded, the simulator multiplies the segment by 16 and adds it to the entry in the table specified by the upper 4 bits of the segment. Second, at the time an instruction reads or writes to memory, the 16 bit offset is added to the 32 bit value computed in the previous step. This is the address used to access memory of the second processing system.

At simulator start up time, the relocate table 195 is initialized. The first 10 entries 201-210 correspond to RAM 152 and are initialized to 0x90010000 to point to segment 0x9 of the second processing system. Note that this initialization value includes a 64K offset that allows room for the first instance of BIOS 155 mapped to segment 0x9, 190, preceding RAM 152. The last entry 216, corresponding to the segment that addresses BIOS 155, is initialized with 0x90000000−0xF0000, or 0x8FF10000. In this fashion when the segment multiplied by 16 is added, the resulting value will be 0x90000000 which maps the BIOS 155 at the beginning of segment 0x9, 190. The eleventh through fifteenth entries 211-215 are initialized with 0xF4000000 or 0x90010000 to point to either segment 0xF, 181 or segment 0x9, 190 depending on whether the corresponding output device of the first processing system is attached.

The status control segment, segment 0x8, 180 is stored in another shared memory segment of the operating system. The status control segment 180 keeps track of the type of contents of memory of the first processing system for segment 0x9, 190. This information is used by the simulator to determine whether the memory location contains data, instruction code, or is a video entry.

The above has described how the simulator computes the address that should be used when simulating an instruction that reads or writes to memory. In the case of writing to memory, special actions may be required.

If an instruction is being stored into memory, then the simulator makes note whether the instruction has been translated. A check for instruction modification is performed to insure that the translated code is always correct. If an application performs instruction modification, the translated code for the original code instruction is purged, and the new instruction is translated to a new sequence of instructions of the simulator's processor. Other steps could be taken to guarantee that the correct translation of the instruction will be executed.

Likewise, the check for video updates is necessary to determine if the output to the output device needs to be further processed by the simulator. This would occur in the case where the output device of the first processing system is not attached to the second processing system running the simulator, and the output device of the first processing system therefore must be simulated. In the case of memory mapped I/O, it must be detected at the time of a store whether the special hardware that is representing the output data is being modified.

At the time of a store to memory, segment 0x8, 180 is used to determine whether a special action is required on either an instruction or memory mapped I/O. Segment 0x8, 180 has a byte to byte correspondence with segment register 0x9, 190. Each byte in segment 0x8 indicates the type of contents of the corresponding byte of segment 0x9, 190. A byte in segment 0x8, 180 will have a zero if the corresponding byte in segment 0x9, 190 is computational data. The byte in segment 0x8, 180 will have either a 1,2,4 or 6, if the corresponding byte in segment 0x9 contains an instruction. Every byte of segment 0x8, 180 which corresponds to the video range 153 of segment 0x9 will contain a 16 if an output device of the first processing system is not attached. The value of 16 will be loaded into segment 0x8, 180 at simulator start up time during configuration.

If it is determined during configuration that an output device of a first processing system is attached to the second processing system, the corresponding bytes of segment 0x8, 180 will be zero. This indicates that the relocate table 195, which also had entries 211-215 initialized during configuration, will map output data from the first processing system to segment 0xF, 181, which requires no further action by the simulator since an output device of the first processing system is attached.

Regardless of the location of the store to memory, either segment 0x9 or segment 0xF, the 32 bit value of the address is ANDed with 0x80FFFFFF which results in the corresponding address of segment 0x8, 180.

The instruction sequence shown in FIG. 10 is used on each translation of a first processing system instruction which is able to modify memory. It should be noted that the segment registers were chosen so that the address of the status byte could be calculated by ANDing the address of the memory byte with 0x80FFFFFF. As a result, both segments 0xF and 0x9 are mapped to segment 0x8. When these four instructions of FIG. 10 are overlapped with the instructions used to simulate the first processing system instruction, only 5 cycles are required to check the memory update to see if it requires special processing. However, it may be necessary to further determine whether the address of the store was to segment 0xF to determine whether special action is required after the store to memory.

By keeping a status byte corresponding to each byte in the memory image 190 or the memory mapped I/O 181, video updates, memory mapped I/O, and instruction modification, can be detected. A flag in the status segment 8, 180, is kept to indicate the content type of memory as follows:

0 = data
1 = instruction entry point
2 = subsequent byte of an instruction
4 = merged instruction (first byte not valid entry point)

8 = breakpoint set on this instruction
16 = video

As shown above, a non zero value may indicate that further action may be required by the simulator. A "1" indicates that it is an entry point, and there is a translation of the first processing system instruction in the binary tree. A "2" means it is a subsequent which means that there is a first processor instruction being simulated or translated that is more than one byte long. This byte then corresponds to a following byte. This allows for the fact that it may take more than one byte to represent a first processor instruction. A flag of "4" indicates that there is a merge. A merge means that as a result of the graph analysis, it was determined that it would take less translated simulator instructions to simulate several combined first processor instructions than it would take to translate each first processor instruction separately. For example, the PUSH instruction 105 and the POP instruction 106 of FIG. 3A have been merged. As a result, the value in the CS register has been moved into the DS register. Since the graph analysis determines that this is all that these two instructions 105, 106, are doing, the two instructions can be combined into one, and executed faster than executing two separate instructions.

A flag of "8" indicates that a breakpoint is set. This allows debuggers to work on the simulator. A flag of 16 indicates that the information is video data. This is how the simulator detects that an application has gone out and updated the video screen.

The above method increases performance over previous simulators that required branching to a subroutine which performed an extensive, time consuming check, processed the memory update, and then returned. Just a branch to a subroutine typically requires at least 5 cycles. This is exemplified since storing to memory is a very frequent operation. Therefore, any reduction in the overhead of a store to memory greatly increases the efficiency of the simulator.

Although the foregoing invention has been particularly shown and described with reference to the preferred embodiments thereof, it will be understood by those skilled in the art that other changes in form may be made without departing from the scope of the claims.

[1] PC AT is a registered trademark of IBM Corporation in the United States.
[2] Personal System/2 is a registered trademark of IBM Corporation in the United States.
[3] RT PC is a registered trademark of IBM Corporation in the United States.
[4] AIX is a trademark of the IBM Corporation in the United States.

What is claimed is:

1. A method for aiding in simulating a first instruction flow of control of an application, said flow of control having a plurality of first instructions of a first processor instruction set, by a plurality of second instructions of a second processor instruction set of a processing system, said method comprising:

creating a table having a plurality of locations corresponding to a plurality of second processor memory locations, each one of said second processor memory locations having contents the same as a respective first processor memory location, for indicating a type of contents for any one of said second processor memory locations;

storing, during a translation of an instruction of said first processor instruction set contained within any one of said second processor memory locations into an instruction of said second processor instruction set, a first indicator, in a location in said table corresponding to said second processor memory location, indicating that the type of contents of said second processor memory location is an instruction;

determining, during a modification to the contents of any one of said plurality of second processor memory locations, whether an instruction is being modified by checking the corresponding location in the table for said stored first indicator; and determining whether translation is necessary for the contents in said second processor memory location being modified if said first indicator indicates an instruction is being modified.

2. A system for aiding in simulating a first instruction flow of control of an application, said flow of control having a plurality of first instructions of a first processor instruction set, by a plurality of second instructions of a second processor instruction set of a processing system, said system comprising:

means for creating a table having a plurality of locations corresponding to a plurality of second processor memory locations, each one of said second processor memory locations having contents the same as a respective first processor memory location, for indicating a type of contents for any one of said second processor memory locations;

means for storing, during a translation of an instruction of said first processor instruction set contained within any one of said second processor memory locations into an instruction of said second processor instruction set, a first indicator, in a location in said table corresponding to said second processor memory location, indicating that the type of contents of said second processor memory location is an instruction;

means for determining, during a modification to the contents of any one of said plurality of second processor memory locations, whether an instruction is being modified by checking the corresponding location in the table for said stored first indicator; and determining whether translation is necessary for the contents in said second processor memory location being modified if said first indicator indicates an instruction is being modified.

3. A method for aiding in simulating a first instruction flow of control of an application, said flow of control having a plurality of first instructions of a first processor instruction set of a first processor, by a plurality of second instructions of a second processor instruction set of a second processor of a processing system, said method comprising:

correlating each one of a plurality of locations in memory with a corresponding indicator indicating a type of contents for the memory location;

determining, during a modification to the contents of any one of said plurality of memory locations of said processing system running said application, whether said application modified any one of said plurality of memory locations having one of said plurality of first instructions, said one of said plurality of first instructions having a translation sequence of said second instructions associated therewith, by checking if the corresponding indicator of said memory location indicates that the type of contents is an instruction; and updating said translation sequence to a new translation sequence of said second instructions, if said one of said first instructions is modified, for simulating the modified first instruction by executing said new translation sequence by said second processor.

4. The method of claim 3 wherein the step of updating comprises the step of purging the translation sequence of one of said first instructions, and translating the modified instruction to a new sequence of said second instructions for execution by said second processor.

5. A detection method for aiding in simulating a first processor, having a first instruction set, of a first processing system, by a second processing system, said second processing system having a second processor having a second instruction set for running an application targeted for said first instruction set, said detection method comprising:

mapping memory of the first processing system into memory of said second processing system;

correlating each one of a plurality of locations of said memory of said second processing system mapped from said first processing system with a corresponding indicator indicating both a type of contents for the memory location and a type of action to take based on the type of contents for said memory location; and determining, at a time of a store to the memory location by said second data processing system, if the store to memory requires simulation processing, depending upon the contents of the memory location, by checking the indicator to determine the type of action to take based on the indicator contents concurrently with the store to the memory location.

6. A detection system for aiding in simulating a first processor, having a first instruction set, of a first processing system, by a second processing system having a second processor having a second instruction set for running an application targeted for said first instruction set, said detection system comprising:

means for mapping a plurality of first address locations of memory of the first processing system into a second plurality of address locations of memory of said second processing system;

means for correlating each one of said second plurality of address locations of memory of said second processing system with a corresponding indicator indicating both a type of contents for each of said second plurality of address locations and a type of action to take based on the type of contents for each of said second plurality of address location; and means for determining, at a time of a store to one of the second address locations of memory by said second data processing system, if the store to memory requires simulation processing, depending upon the contents of the memory location, by checking the indicator to determine the type of action to take based on the indicator contents concurrently with the store to the memory location.

7. A detection system for aiding in simulating a first processor, having a first instruction set, of a first processing system, by a second processing system having a second processor having a second instruction set for running an application targeted for said first instruction set, said detection system comprising:

means for translating a plurality of address locations of memory of the first processing system into (i) a first plurality of translated address locations of a first memory segment of said second processing system and (ii) a second plurality of translated address locations of a second memory segment of said second processing system, said second plurality of translated address locations corresponding to memory mapped I/O of an adapter;

means for correlating each one of said translated address locations in said first and second memory segments with a third memory segment address location, in said second processing system, containing an indication of both a type of contents for a corresponding location in said first and second memory segment and a type of action to take based on the type of contents for said corresponding location in said first and second memory segment;

means for performing an AND operation on one of said first and second plurality of translated address locations with a constant value and using this result to find the type of contents, of said one address location, from said corresponding third memory segment address location during a modification to the contents of said one address location by said second processing system; and means for determining, concurrently with the modification to the contents of the one address location, whether simulation processing is necessary for the contents in memory being modified, depending upon the type of contents of said one address location, as indicated by said corresponding third memory segment address location.

8. The system of claim 7 wherein if said corresponding third memory segment address location contains a zero value, no simulation processing is required on said contents of said one address location.

9. The system of claim 7 wherein if said corresponding third memory segment address location indicates that the type of contents is a translated instruction in said memory of said second processing system, simulation processing is necessary if the contents of the one address location is modified.

10. The system of claim 7 wherein if said corresponding third memory segment address location indicates that there is an output device of said first processing system attached to said second processing system, no simulation processing is required on said modified contents of the one address location.

11. The system of claim 7 wherein if said corresponding third memory segment address location indicates that an output device of the first processing system is not attached to said second processing system, simulation processing is needed on said modified contents of the one address location.

12. A method of aiding in simulating a first processor, having a first instruction set, of a first processing system, by a second processing system, said second processing system having a second processor having a second instruction set for running an application targeted for said first instruction set, said method comprising:

translating a plurality of address locations of memory of the first processing system into a translated plurality of address locations of a first memory segment of said second processing system;

correlating each of said translated plurality of address locations of said first memory segment with a corresponding second memory segment address location containing an indication of both a type of contents of the corresponding translated address location of said first memory segment in said second processing system and a type of action to take based on the contents of the corresponding translated address location of said first memory segment in said second processing system;

performing an instruction sequence on each one of a plurality of translations, of a first processing system instruction, which is able to modify a content of said first memory segment address location of said second processing system, to determine the type of contents, of the corresponding translated address location of said first memory segment in said second processing system, as indicated by the corresponding second memory segment address location of said second processing system; and determining if simulation processing is required on said content of said first memory segment address location depending on the type of action to take, based on the contents of said first memory segment address location, as indicated by said corresponding second memory segment location.

* * * * *